May 3, 1927.
M. M. MORATTA
PISTON RING
Filed July 16, 1926
1,627,107
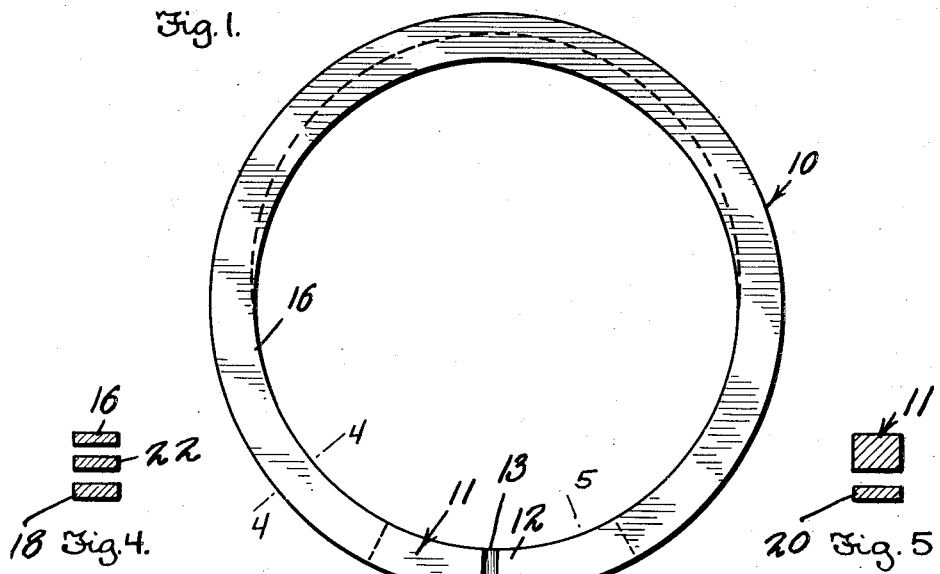
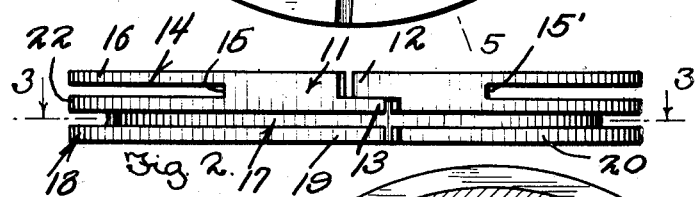
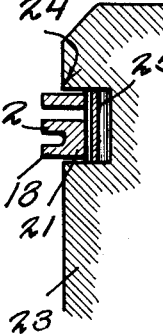
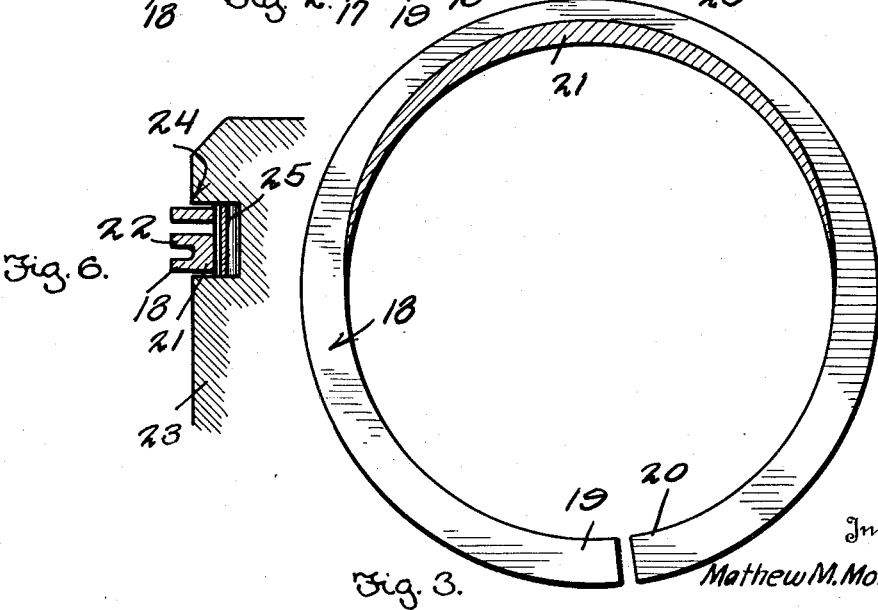
Inventor
Mathew M. Moratta
By Richard B. Owen
Attorney
Witnesses
O. E. Churchman Jr.

Patented May 3, 1927.

1,627,107

UNITED STATES PATENT OFFICE.

MATHEW M. MORATTA, OF PRINCETON, INDIANA.

PISTON RING.

Application filed July 16, 1926. Serial No. 122,951.

This invention relates to new and useful improvements in packing rings and has more specific reference to a novel piston ring of the type primarily designed for use in the pistons of reciprocating mechanism such as engines.

The ring provided by the invention is best adapted for use in connection with the piston of an internal combustion engine although it will be readily understood that it is not in any way limited to such specific application as it might advantageously be employed in similar mechanism of various forms and adapted for use in various arts. For instance, it might well be employed in steam, pneumatic, and other like machinery.

An important object of the present invention is to provide an improved piston ring of the above character which is particularly noteworthy because of its simplicity and inexpensive construction.

Another object of the present invention is to provide an improved piston ring of the above character which is of an efficient construction, one which is reliable in use, durable, easy and cheap to manufacture and well designed for the purposes for which it is intended.

Numerous other objects and advantages of the present invention will become more readily apparent during the course of the following description when taken in connection with the accompanying drawings.

In the drawings forming a part of this application and wherein like characters of reference denote corresponding parts throughout the several views:

Figure 1 is an edge elevation of a piston ring constructed in accordance with the present invention.

Figure 2 is an elevation of the improved ring.

Figure 3 is a sectional view taken on the line 3—3 of Figure 2.

Figure 4 is a sectional view taken on the line 4—4 of Figure 1.

Figure 5 is a sectional view taken on the line 5—5 of Figure 1.

Figure 6 is a transverse sectional view through the back of the ring arranged in place in a typical piston.

Referring now more in detail to the accompanying drawings, the novel piston ring constituting the present invention is generally indicated by the numeral 10 and embodies in its construction the split resilient body 11, the meeting ends of which are provided with the overlapping shoulders 12 and 13 as clearly shown in Figure 2.

The body 11 is provided adjacent one edge thereof with an oil groove 14 which goes completely through the ring and which extends substantially the entire circumference thereof. The ends of the groove 14 terminate at opposite sides of the divisional ends of the body as indicated at 15 and 15' and the provision of the said groove defines an upper ring 16.

The body 11 is also provided with a second oil groove 17 which extends entirely through the body of the ring at the front thereof and defines a lower ring 18 having the separated ends or fingers 19 and 20. The oil groove 17 is struck on an axis eccentric to the axis of the body 11 so that the said groove 17 gradually decreases in depth towards the back of the ring to define the semi-circular bridge wall 21. The formation of the oil grooves 14 and 17 also define an intermediate ring 22 and the bridge wall 21 serves to connect the back of the lower ring 18 with the back of the intermediate ring 22.

In Figure 6 of the drawings, the numeral 23 generally indicates a piston formed with the usual groove 24 for carrying the piston ring 10. The purpose of this figure of the drawing is merely to facilitate in setting forth the manner in which the ring 10 may be employed, and therefore, the piston shown is of a simple form and construction having only one ring groove 34. When placing the ring 10 within the groove 24, it is preferred to use in association therewith an inner ring 25 which is arranged within the outer ring 10. This inner ring may be of any conventional or preferred construction and is preferably of the corrugated ribbon steel type. This inner ring serves to prevent piston slap and to facilitate the seating of the ring 10. Also, the inner ring 25 serves to retain the outer ring 10 from sticking in the groove 24.

It is believed that from the foregoing, the construction and application of my improved piston ring will be readily apparent and it is to be understood that changes in the details of construction may be resorted to

What is claimed is:

1. A piston ring comprising a split resilient body formed with a pair of oil grooves, one of said grooves extending completely through the body and substantially the entire circumference of the ring, and the other groove extending entirely through the body of the ring at the front thereof and decreasing in depth towards the back of said ring.

2. A piston ring comprising a split resilient body formed with a pair of oil grooves, one of said grooves extending completely through the body and substantially the entire circumference of the ring, and the other groove extending entirely through the body at the front of the ring and decreasing in depth towards the back thereof, the provision of said grooves defining spaced upper, lower and intermediate rings.

3. A piston ring comprising a split resilient body formed with a pair of oil grooves, one of said grooves extending completely through the body and substantially the entire circumference of the ring, and the other groove extending entirely through the body at the front of the ring and decreasing in depth towards the back thereof, the provision of said grooves defining spaced upper, lower and intermediate rings, and a bridge wall connecting the back of the lower ring with the back of the intermediate ring.

4. A piston ring comprising a split resilient body formed wtih a pair of oil grooves, one of said grooves extending completely through the body and substantially the entire circumference of the ring, and the other groove extending entirely through the body at the front of the ring and decreasing in depth towards the back thereof, the provision of said grooves defining spaced upper, lower and intermediate rings, one of said grooves being struck on an axis eccentric to the axis of said body whereby to define a bridge wall for connecting the back of the lower ring to the back of the intermediate ring.

5. A piston ring including a split resilient body having a pair of oil grooves defining upper, lower and intermediate rings, one of said grooves extending completely through the body and substantially the entire circumference of the piston ring, the opposite ends of said groove terminating at opposite sides of the divisional ends of the body, and the other groove extending entirely through the body at the front of the ring and decreasing in depth towards the back thereof, and a bridge wall connecting the lower ring with the intermediate ring.

In testimony whereof I affix my signature.

MATHEW M. MORATTA.